United States Patent [19]
Ikeda

[11] Patent Number: 5,113,815
[45] Date of Patent: May 19, 1992

[54] IGNITION CONTROL APPARATUS FOR AN INTERNAL COMBUSTION ENGINE

[75] Inventor: Toru Ikeda, Himeji, Japan

[73] Assignee: Mitsubishi Denki Kabushiki Kaisha, Tokyo, Japan

[21] Appl. No.: 690,243

[22] Filed: Apr. 24, 1991

[30] Foreign Application Priority Data

May 17, 1990 [JP] Japan ............................. 2-50751[U]
May 17, 1990 [JP] Japan ............................. 2-50752[U]

[51] Int. Cl.$^5$ ............................................. F02P 1/00
[52] U.S. Cl. ................................ 123/146.5 B; 305/10.1; 305/10.2
[58] Field of Search .............. 123/146.5 B, 198 B, 123/179 B; 180/287; 307/10.1, 10.2, 10.6

[56] References Cited

U.S. PATENT DOCUMENTS

| | | | |
|---|---|---|---|
| 3,675,036 | 7/1972 | Davies | 123/146.5 B |
| 3,720,284 | 3/1973 | Myers | 123/146.5 B |
| 4,186,710 | 2/1980 | Kilgore | 123/146.5 B |
| 4,207,850 | 6/1980 | Wharton | 123/146.5 B |
| 4,300,495 | 11/1981 | Trevino et al. | 123/198 B |
| 4,636,651 | 1/1987 | Kilgore | 307/10 AT |
| 4,762,198 | 8/1988 | Vagnone et al. | 180/287 |
| 4,884,207 | 11/1989 | Asada et al. | 364/431.03 |

FOREIGN PATENT DOCUMENTS

| | | | |
|---|---|---|---|
| 41958 | 2/1990 | Japan | 123/146.5 B |
| 51159 | 3/1990 | Japan | 123/146.5 B |

Primary Examiner—Raymond A. Nelli
Attorney, Agent, or Firm—Sughrue, Mion, Zinn, Macpeak and Seas

[57] ABSTRACT

An ignition control apparatus for an internal combustion engine in which the engine can not be started without the operation of a switch unit, thus preventing the theft of a motorcycle on which an ignition control apparatus of the invention is installed. A switch unit includes a key switch connected to a power source and a control element in the form of a resistor or a transistor. An ignition control unit is connected to the switch unit for supplying a key signal to the control element when the key switch is turned on, so that based on the key signal the control element energizes the ignition control unit for performing ignition control on the engine.

9 Claims, 6 Drawing Sheets

IGNITION CONTROL APPARATUS FOR AN INTERNAL COMBUSTION ENGINE

BACKGROUND OF THE INVENTION

The present invention relates to an ignition apparatus for an internal combustion engine particularly suitable for use with a motorcycle for preventing the theft thereof.

A typical example of a known ignition apparatus will be described below with reference to FIG. 8. In FIG. 8, the known ignition apparatus illustrated includes a switch unit 2 having a key switch 20 connected via a junction b to a battery 1, a power circuit 30 connected via a junction a to the key switch 20, and an ignition control unit 3 having a controller 31 in the form of a central processing unit (CPU) connected to the power circuit 30. The battery 1 generates a voltage of 12 volts for example, and the power circuit 30 reduces the source voltage of 12 volts to 5 volts for example.

In operation, the key switch 20 of the switch unit 2 is turned on and off to control the power supply to the CPU 31 for performing ignition control on the engine.

In this connection, if the switch unit 2 is disconnected for some reason such as by a thief the junctions a and b are directly connected or "hot wired" to each other, power is supplied to the ignition control unit 3 from the battery 1, and the engine can be started under the control of the ignition control unit 3. That is, the engine can be started in an easy manner without the need of the engine key or the key switch 20.

Thus, with the above-described known ignition apparatus for an internal combustion engine, there is a problem that the engine can be started very easily without the operation of the switch unit 2.

SUMMARY OF THE INVENTION

Accordingly, the present invention is intended to overcome the above-described problems encountered with the known ignition control apparatus for an internal combustion engine, and has for its object the provision of a novel and improved ignition apparatus for an internal combustion engine in which the engine can not be started without the operation of a switch unit, thus preventing the theft of a motorcycle on which an ignition control apparatus of the invention is installed.

In order to achieve the above object, according to the present invention, there is provided an ignition apparatus for an internal combustion engine comprising:

a switch unit including a key switch connected to a power source and a control element;

an ignition control unit connected to the switch unit for supplying a signal to the control element when the key switch is turned on, so that the control element energizes, based on the signal, the ignition control unit for performing ignition control on the engine.

In one embodiment, the control element comprises a first resistor having opposite ends, and the ignition control unit comprises a power circuit connected to the key switch, and a controller connected to the power circuit. The controller has a first port connected to one end of the first resistor which has the other end thereof connected to ground through a voltage divider, a second port connected to the other end of the first resistor, and a third port connected to the voltage divider.

Preferably, the voltage divider comprises a second resistor and a third resistor serially connected to each other between the first resistor and ground, the third port of the controller being connected to a node between the second and third resistors.

In another embodiment, the control element comprises a transistor, and the ignition control unit comprises a power circuit connected to the key switch, and a controller connected to the power circuit. The controller has a first port connected to the transistor for generating a signal to the transistor for turning the transistor on or off when the key switch is switched on, and a second port connected to a constant power source through the transistor so that a voltage applied by the constant voltage source to the second port is controlled by the on-off operation of the transistor.

In a further embodiment, the control element comprises a transistor, and the ignition control unit comprises a power circuit connected to the key switch, and a controller connected to the power circuit. The controller has a first port connected to the transistor for generating a signal to the transistor for turning the transistor on or off when the key switch is switched on, and a second port connected to the power source through the transistor and the key switch so that a voltage applied by the power source to the second port is controlled by the on-off operation of the transistor.

The above and other objects, features and advantages of the present invention will becomes more readily apparent from the following detailed description of a few preferred embodiments of the invention taken in conjunction with the accompanying drawings.

DESCRIPTION OF THE PREFERRED EMBODIMENTS

Figure 1:
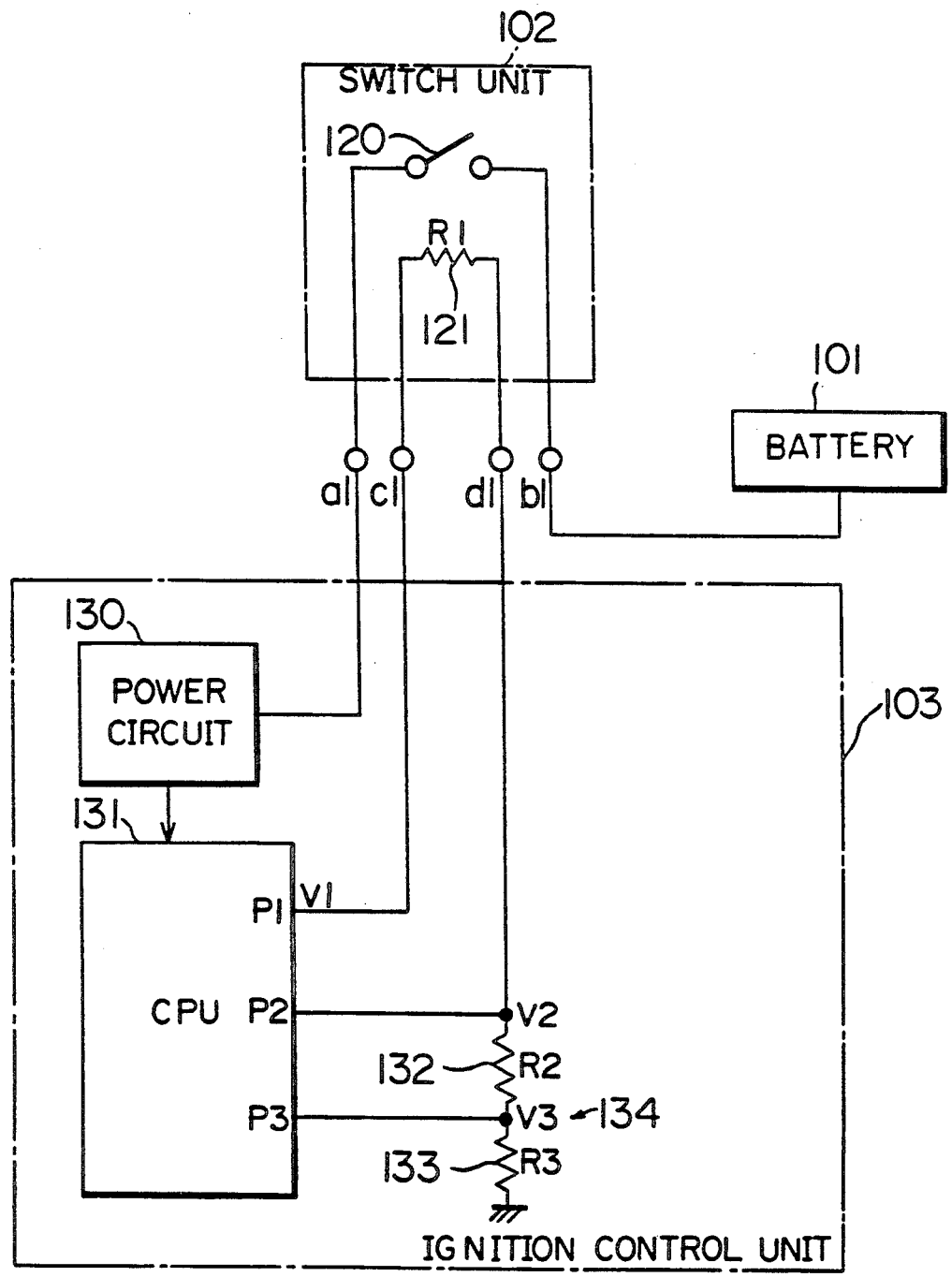
FIG. 1 is a block diagram showing the general construction of an ignition apparatus for an internal combustion engine in accordance with one embodiment of the present invention.

A few preferred embodiments of the present invention will now be described while referring to the drawings.

FIG. 1 illustrates an ignition apparatus for an internal combustion engine in accordance with a first embodiment of the present invention. The ignition apparatus illustrated includes a switch unit 102 connected to a power source 101 in the form of a battery, and an ignition control unit 103 connected to the switch unit 102. The switch unit 102 includes a key switch 120 having one end thereof connected via a junction or connected b1 to the battery 101 and the other end thereof connected to a junction or connector a1, and a control element 121 in the form of a resistor having one end thereof connected to a junction or connector c1 and the other end thereof connected to a junction or connector d1.

The ignition control unit 102 includes a power circuit 130 connected to the junction a1, and a controller 131 in the form of a central processing unit (CPU) connected to the power circuit 130. The controller 131 has a first port P1 connected to the junction c1, a second port P2 and a third port P3 which are connected to the junction d1 through a voltage divider 134. The voltage divider 134 comprises a pair of resistors 132, 133 serially connected to each other between the junction d1 and ground. The resistor 132 has one end thereof connected in common to the second port P2 of the controller 131 and the junction d1. The resistor 133 has one end thereof connected in common to the third port P3 of the controller 131 and to the other end of the resistor 132, and the other end thereof grounded. In this figure, the resistances of the resistors 121, 132 and 133 are of the values of R1, R2 and R3, respectively, which are substantially the same value.

The operation of the above-described embodiment will now be described in detail while referring to FIGS. 2 and 3.

Figure 2:
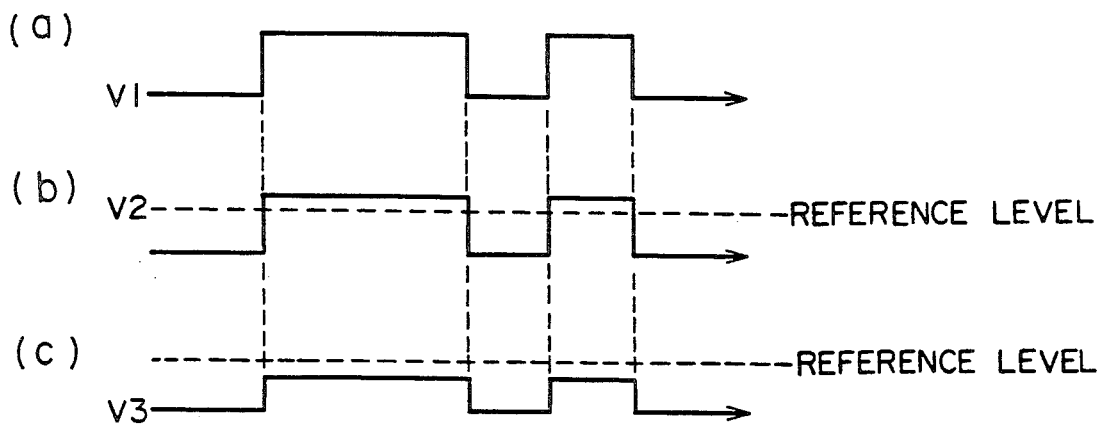
FIG. 2 is a diagrammatic view showing the waveforms of signals at ports P1 through P3 of a controller 131 of FIG. 1.
Figure 3:
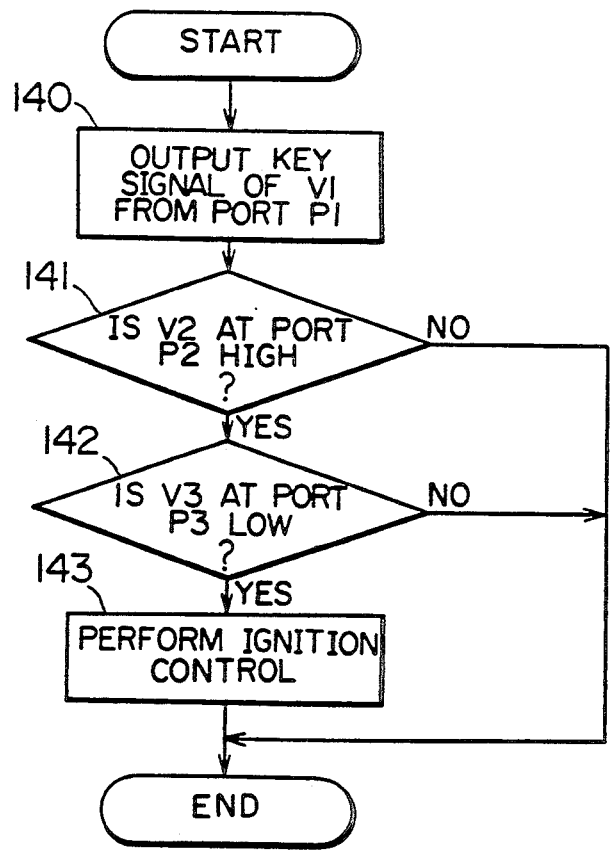
FIG. 3 is a flow chart showing the operation of the embodiment of FIG. 1.

When the key switch 120 is turned on, the controller 131 of the ignition control unit 103 generates, at the port P1, a programmed or predetermined key signal of a voltage V1 containing a combination of high and low levels which repeatedly occur alternately at predetermined timings for predetermined periods of time, as shown by (a) in FIG. 2. The key signal of the voltage V1 output from the first port P1 is divided into voltages V2, V3 by the resistor 121 in the switch unit 102 and the resistors 132, 133 in the ignition control unit 103. The divided voltages V2 and V3 supplied to the second and third ports P2, P3 are expressed as follows $$V2 = \{(R2+R3)/(R1+R2+R3)\} \times V1$$

$$V3 = \{R3/(R1+R2+R3)\} \times V1$$

If the divided voltages V2 and V3 input to the ports P2, P3 of the controller 131 are high and low, respectively, the controller 131 performs ignition control on the unillustrated engine. That is, when the key switch 120 of the switch unit 102 is switched on, the controller 131 outputs a key signal of the voltage V1 at the port P1. Then in Step 141, it is determined whether the voltage at the port P2 of the controller 131 is at the high level. That is, as shown by (b) in FIG. 2, it is determined whether the voltage V2 is greater than a prescribed reference level which is substantially at a midpoint between the voltages V2, V3.

In Step 142, it is further determined whether the voltage V3 is at the low level. That is, as shown by (c) in FIG. 2, it is determined whether the voltage V3 is less than the reference level.

In Step 143, if the voltages V2, V3 supplied to the ports P2, P3 are at the high and low level, repsectively, the controller 131 performs ignition control. On the other hand, if the voltage V1 at the port P1 is at the low level, the voltages V2, V3 at the ports P2, P3 are also low. In this case, the controller 131 does not perform ignition control. Thus, the controller 131 outputs a key signal having a high and a low level which occur at predetermined timings for predetermined periods of time in a repeated manner. As a result, if the switch unit 102 is disconnected from the ignition control unit 103 with the junctions c1 and d1 being directly connected with each other, the voltages V2, V3 at the ports P2, P3 will both become high, i.e., greater than the reference level, thus preventing engine starting.

Figure 8:
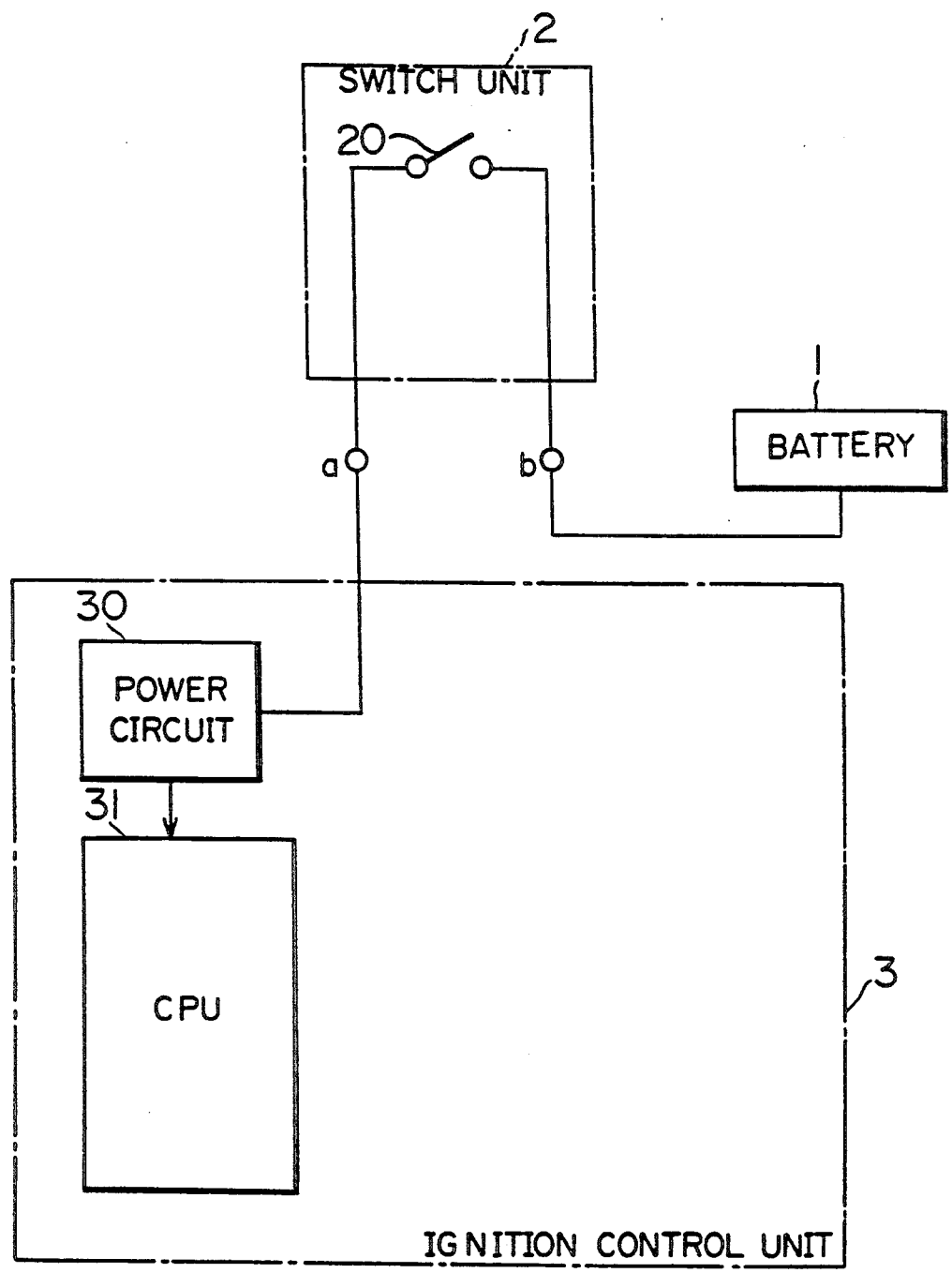
FIG. 8 is a block diagram showing a known ignition apparatus for an internal combustion engine.

As described in the foregoing, the switch unit 102 is provided with the resistor 121 so that the controller 131 performs ignition control based on the divided voltage signals from the resistor 121. With this arrangement, even if the switch unit 102 is disconnected from the ignition control unit 103 with the junctions a1, b1 and the junctions c1, d1 directly connected with each other, it is impossible to start the engine, thus preventing the theft of a motorcycle on which the ignition apparatus of the invention is installed. Further, with the above embodiment, it is not necessary for the user to do any new or additional operations or procedures other than the conventional ones required with the known apparatus of FIG. 8.

Although in the above embodiment, the resistances R1, R2 and R3 of the resistors 121, 132 and 133 are substantially of the same value, they may be of other appropriate values if the divided voltage signals applied to the second and third ports P2, P3 of the controller 131 can be discriminated based on the presence or absence of the resistor 121 in the switch unit 102. In this case, too, substantially the same results will be obtained.

Figure 4:
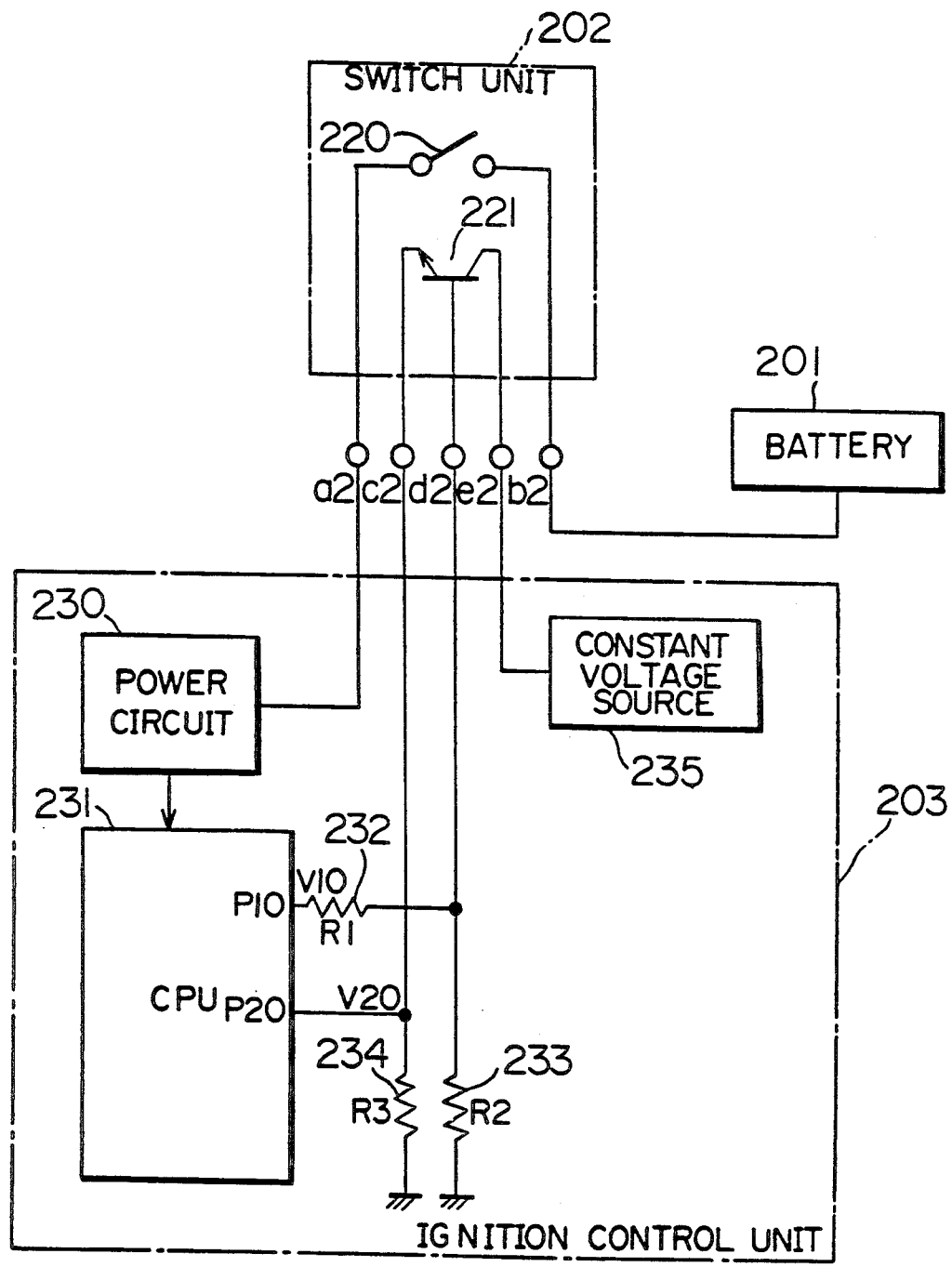
FIG. 4 is a block diagram showing another embodiment of the present invention.

FIG. 4 illustrates another embodiment of the present invention. In this embodiment, the ignition apparatus includes a switch unit 202 connected to a power source 201 in the form of a battery, and an ignition control unit 203 connected to the switch unit 202.

The switch unit 202 includes a key switch 220 having one end thereof connected through a junction or connector b2 to the battery 201 and the other end thereof connected to a junction a2, and a control element 221 in the form of a transistor which is, in the illustrated example, an NPN transistor. The transistor 221 has an emitter connected to a junction c2, a base connected to a junction d2 and a collector connected to a junction e2.

The ignition control unit 203 includes a power circuit 230 connected to the junction a2, a controller 231 in the form of a CPU connected to the power circuit 230 and having a first port P10 and a second port P20, and a constant voltage source 235 connected to the junction e2 and hence to the collector of the transistor 221. The first port P10 of the controller 231 is connected to the junction d2 via a voltage divider which comprises a resistor 232 having one end thereof connected to the first port P10 of the controller 231 and the other end thereof connected to the junction d2, and a resistor 233 having one end thereof connected to a node between the junction d2 and the resistor 232 and the other end thereof connected to ground. The junction c2 or the emitter of the transistor 221 is connected to ground via a resistor 234, and the second port P20 of the controller 231 is connected to a node between the junction c2 and the resistor 234. In this connection, the resistances R1, R2 and R3 of the resistors 232, 233 and 234 have the following relationship;

$$R3 < R1 < R2$$

Next, the operation of the second embodiment will be described while referring to FIGS. 5 and 6.

Figure 5:
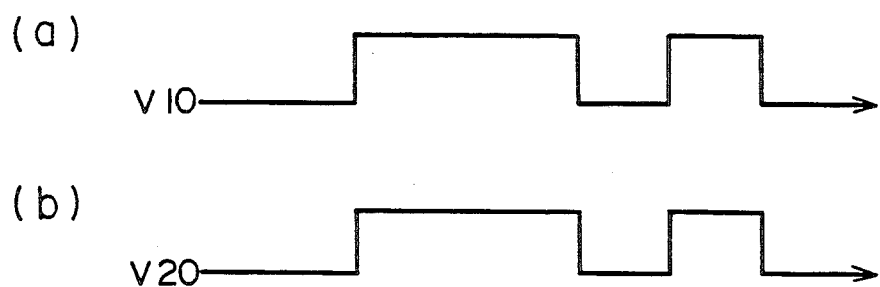
FIG. 5 is a diagrammatic view showing the waveforms at ports P10 and P20 of a controller 231 of FIG. 4.
Figure 6:
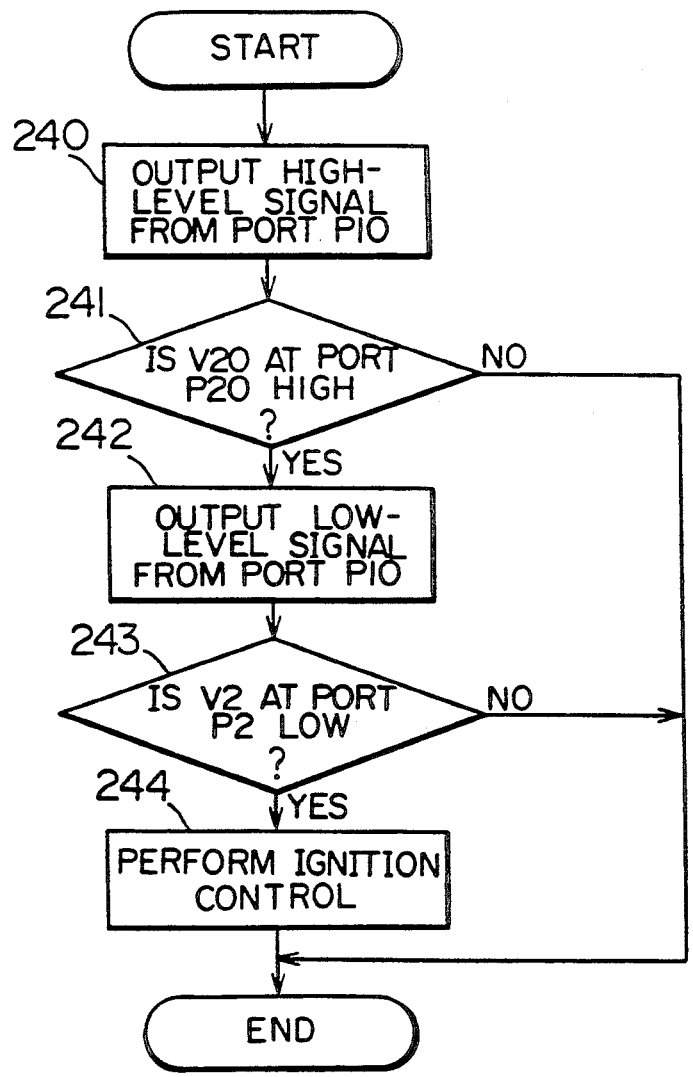
FIG. 6 is a flow chart showing the operation of the embodiment of FIG. 4.

As in the case of the first embodiment of FIG. 1, when the key switch 220 of the switch unit 202 is turned on, the controller 231 in the ignition control unit 203 generates, at the first port P10, a programmed or predetermined key signal of a voltage V10 in the form of a combination of high and low levels, as shown by (a) in FIG. 5. The key signal of the vlotage V10 output from the first port P10 of the controller 231 operates to turn the transistor 221 in the switch unit 202 on and off so that a voltage V20 is supplied from the constant vlotage source 235 to the second port P20 of the controller 231 in synchronism with the on/off operation of the transistor 221, as shown by (b) in FIG. 2. The controller 231 compares the waveform of the key signal V10 output from the first port P10 with that of the voltage V20 input to the second port P20, and performs ignition control only if the waveforms of the voltages V10 and V20 are the same.

Specifically, in Step 240, when the key switch 220 is switched on, a high level key signal is output from the first port P10 of the controller 231. Then in Step 241, it is determined whether a voltage V20 at the second port P20 is high. That is, it is determined whether the voltage V20 is greater than a predetermined reference level, and if the answer is "YES", the voltage V20 at the second port P20 is determined to be high.

Subsequently in Step 242, the controller 231 outputs a low level signal at the first port P10. Then in Step 243, it is further determined whether the voltage V20 at the second port P20 is low. That is, it is determined whether the voltage V20 is less that a prescribed reference level, and if the answer is "YES", the voltage V20 is determined to be low.

In Step 244, if the voltage V20 at the second port P20 changes between the high and low levels in synchronism with the change between the high and low levels in the voltage V10 at the first port P10, the controller 231 performs ignition control.

As shown by (a) in FIG. 5, the controller 231 repeatedly outputs a signal of high or low levels at predetermined timings for predetermined periods of time. Accordingly, in the event that the switch unit 202 is disconnected from the ignition control unit 203 with the junction c2 and d2 being directly connected with each other, the voltage V10 of the high level output from the first port P10 is divided by the resistors 232, 233 and then applied to the second port P20. As a result, the divided voltage V10 or the voltage V20 even at its high level applied to the second port P20 becomes less than the predetermined reference level, so that there will be disagreement between the voltage V10 at the port P10 and the voltage V20 at the port P20, thus preventing engine starting.

Although in the above-described second embodiment, the voltage V20 is supplied from the constant voltage source 235 to the port P20 of the controller 231, it can be supplied from the battery 201.

Figure 7:
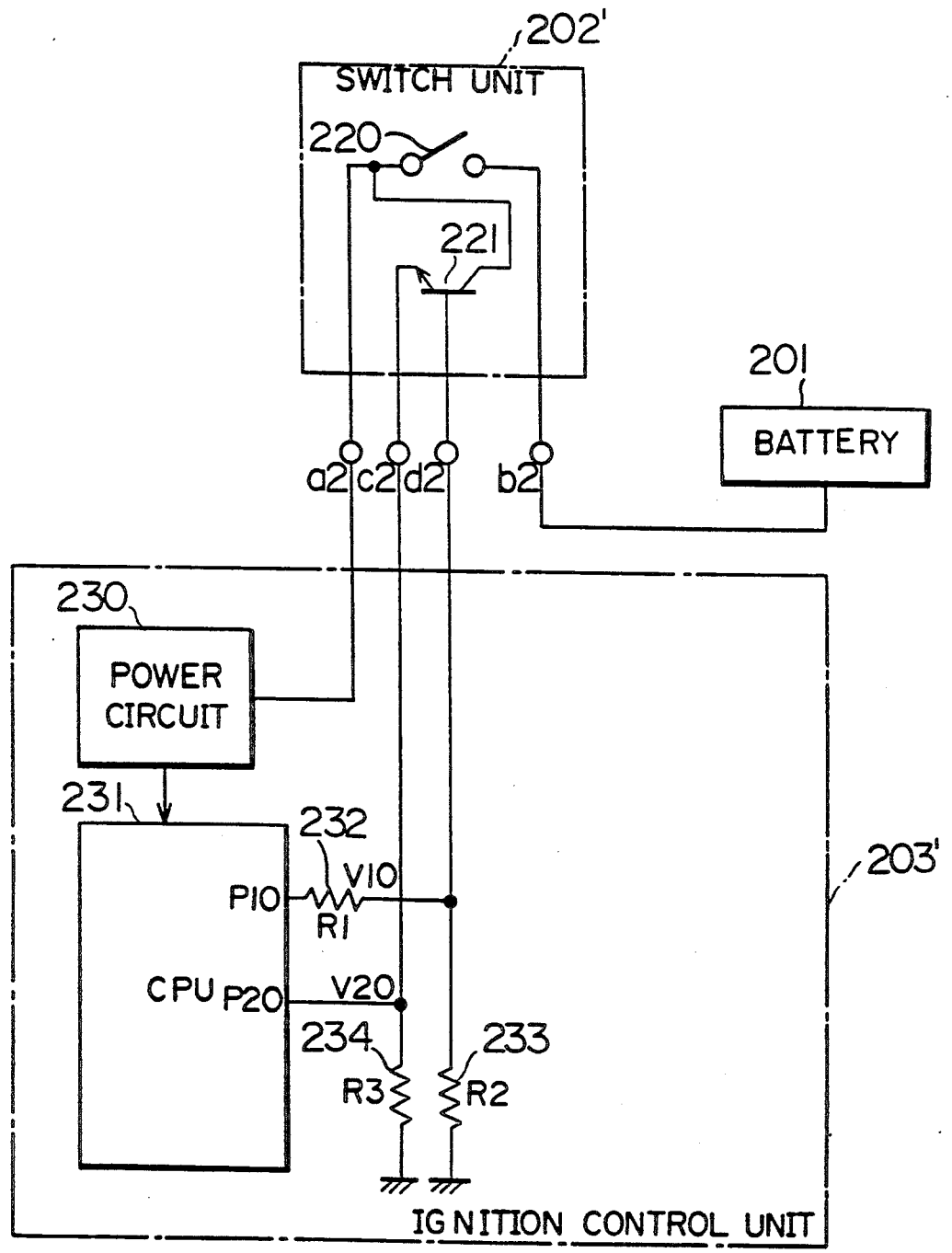
FIG. 7 is a block diagram similar to FIG. 4, but showing a modified form of the present invention.

FIG. 7 illustrates an embodiment in which the collector of the transistor 221 of the switch unit 202' is connected to a node between the junction a2 and the key switch 220 so that the battery 201 supplies power to the transistor 221 through the key switch 220, while providing substantially the same results. In this case, since the constant voltage source 235 of FIG. 4 is omitted, the number of lead wires required is accordingly reduced.

What is claimed is:

1. An ignition control security apparatus for an internal combustion engine comprising:
   a switch unit including a key switch (120; 220) connected to a power source (101; 201), and a control element (121; 221);
   an ignition control unit (103; 203) connected to said switch unit for supplying a signal to an input of said control element when said key switch is turned on, and
   feedback circuit means connecting an output of the control element to the ignition control unit such that, based on a feedback output signal from said control element, said ignition control unit decisionally enables or disables ignition control on the engine, and attendantly prevents engine operation when the power source is connected directly to the ignition control unit.

2. An ignition control security apparatus according to claim 1, wherein said control element comprises a first resistor (121) having opposite ends, and said ignition control unit comprises a power circuit (130) connected to said key switch, and a controller (131) connected to said power circuit and having a first port (P1) connected to one end of said first resistor which has the other end thereof connected to ground through a voltage divider (132, 133), a first port (P2) connected to the other end of said first resistor, and a third port (P2) connected to said voltage divider.

3. An ignition control security apparatus according to claim 2, wherein said voltage divider comprises a second resistor and a third resistor serially connected to each other between said first resistor and ground, the third port of said controller being connected to a node between said second and third resistors.

4. An ignition control security apparatus according to claim 1, wherein said control element comprises a transistor (221), and said ignition control unit comprises a power circuit (230) connected to said key switch, and a controller (231) connected to said power circuit, said controller having a first port (P10) connected to said transistor for generating a signal to said transistor for turning on or off said transistor when said key switch is switched on, and a second port (P20) connected to a constant power source (235) through said transistor so that a voltage applied by said constant voltage source to the second port is controlled by the on-off operation of said transistor.

5. An ignition control security apparatus according to claim 4, wherein said transistor has a base connected thrrough a voltage divider (232, 233) to the first port of said controller, an emitter connected to the second port of said controller and a collector connected to said constant power source.

6. An ignition control security apparatus according to claim 5, wherein said voltage divider comprises a first resistor having one end thereof connected to the base of said transistor and the other end thereof connected to ground, and a second resistor having one end thereof connected to the first port of said controller and the other end thereof connected to a node between the base of said transistor and the second resistor.

7. An ignition control security apparatus according to claim 1, wherein said control element comprises a transistor (221), and said ignition control unit comprises a power circuit (230) connected to said key switch, and a controller (231) connected to said power circuit, said controller having a first port (P10) connected to said transistor for generating a signal to said transistor for turning on or off said transistor when said key switch is switched on, and a second port (P20) connected to said power source through said transistor and said key switch so that a voltage applied by said power source to the second port is controlled by the on-off operation of said transistor.

8. An ignition control security apparatus according to claim 7, wherein said transistor has a base connected through a voltage divider to the first port of said controller, an emitter connected to the second port of said controller and a collector connected to said key switch.

9. An ignition control security apparatus according to claim 8, wherein said voltage divider comprises a first resistor having one end thereof connected to the base of said transistor and the other end thereof connected to ground, and a second resistor having one end thereof connected to the first port of said controller and the other end thereof connected to a node between the base of said transistor and the second resistor.

* * * * *